(12) United States Patent
Morales

(10) Patent No.: US 9,174,381 B1
(45) Date of Patent: Nov. 3, 2015

(54) ADJUSTABLE SEALANT DISPENSING SYSTEM

(71) Applicant: James Vincent Morales, Florissant, MO (US)

(72) Inventor: James Vincent Morales, Florissant, MO (US)

(73) Assignee: THE BOEING COMPANY, Chicago, IL (US)

( * ) Notice: Subject to any disclaimer, the term of this patent is extended or adjusted under 35 U.S.C. 154(b) by 260 days.

(21) Appl. No.: 13/621,649

(22) Filed: Sep. 17, 2012

(51) Int. Cl.
*B29C 47/16* (2006.01)
*B29C 47/10* (2006.01)

(52) U.S. Cl.
CPC .................. *B29C 47/16* (2013.01); *B29C 47/10* (2013.01); *B29C 47/165* (2013.01)

(58) Field of Classification Search
CPC ........ B29C 47/10; B29C 47/16; B29C 47/165
USPC ........................................... 425/87, 381, 466
See application file for complete search history.

(56) References Cited

U.S. PATENT DOCUMENTS

| | | | | | |
|---|---|---|---|---|---|
| 1,234,017 | A | * | 7/1917 | Hanley, Jr. | 425/466 |
| 1,463,407 | A | * | 7/1923 | Sharp et al. | 425/466 |
| 2,746,085 | A | * | 5/1956 | Sailors | 401/179 |
| 3,112,527 | A | * | 12/1963 | Pankratz et al. | 425/466 |
| D310,635 | S | | 9/1990 | Schultz et al. | |
| 6,251,324 | B1 | * | 6/2001 | Forte et al. | 264/260 |
| 7,232,273 | B2 | | 6/2007 | Nealon et al. | |

OTHER PUBLICATIONS

"Material Dispense Valves," Sealant Equipment & Engineering, Inc. brochure with product specifications, copyright 2007, 12 PAGES, accessed Sep. 17, 2012 http://www.sealantequipment.com/pdf/Brochures/SEEValveBrochure2007.pdf.
"Needles & Tips," IntelliSpence Integrated Dispensing Solutions, Inc., copyright 2010, 2 PAGES, accessed Sep. 17, 2012 http://www.dispensinglink.com/dispense_needles.htm.

* cited by examiner

*Primary Examiner* — Yogendra Gupta
*Assistant Examiner* — Joseph Leyson
(74) *Attorney, Agent, or Firm* — Yee & Associates, P.C.

(57) ABSTRACT

A method and apparatus for applying a sealant material onto a surface. In one illustrative embodiment, an apparatus comprises a dispenser and an adjustment system associated with the dispenser. The dispenser is configured to receive a sealant material from a sealant source and dispense the sealant material through an output of the dispenser. The adjustment system is configured to change a configuration of the output.

17 Claims, 7 Drawing Sheets

ADJUSTABLE SEALANT DISPENSING SYSTEM

BACKGROUND INFORMATION

1. Field

The present disclosure relates generally to a dispensing system, and in particular, to a dispensing system for sealant material. Still more particularly, the present disclosure relates to a method and apparatus for dispensing sealant material onto a surface in the form of a sealant ribbon having a desired width and depth.

2. Background

During the manufacturing and assembly of different types of objects, sealant materials are often used to seal various surfaces. Different types of sealant materials are currently available for use. These different types of sealant materials include, but are not limited to, acrylic sealant materials, silicone sealant materials, epoxy sealant materials, fibrin sealant materials, latex sealant materials, rubber sealant materials, conductive elastomer sealant materials, elastomeric sealant materials, and other types of sealant materials.

Oftentimes, a sealant material is dispensed onto a surface using a dispensing tool such as, for example, without limitation, a sealant tube, a sealant gun, or some other type of dispensing tool. These types of dispensing tools typically dispense the sealant material in the form of a sealant ribbon. This sealant ribbon may also be referred to as a sealant strip.

However, with some currently available dispensing tools, the amount of sealant that is dispensed is fixed and not adjustable. In particular, these dispensing tools may be unable to change the width or the depth of the sealant ribbon formed. Consequently, in some situations, excess sealant material may be dispensed. The dispensing of excess sealant may increase the cost of applying the sealant material more than desired.

In other situations, insufficient amounts of sealant material may be dispensed and repeated passes for applying the sealant material may be needed to achieve a desired depth and/or desired width for the sealant ribbon. These repeated passes may be more time-consuming than desired. Therefore, it would be desirable to have a method and apparatus that takes into account at least some of the issues discussed above, as well as other possible issues.

SUMMARY

In one illustrative embodiment, an apparatus comprises a dispenser and an adjustment system associated with the dispenser. The dispenser is configured to receive a sealant material from a sealant source and dispense the sealant material through an output of the dispenser. The adjustment system is configured to change a configuration of the output.

In another illustrative embodiment, a sealant dispensing system comprises a dispenser and an adjustment system associated with the dispenser. The dispenser is configured to receive a sealant material from a sealant source and dispense the sealant material through an output of the dispenser onto a surface as a sealant ribbon. The adjustment system is configured to change at least one of a width and a depth of the output of the dispenser to change at least one of a width and a depth, respectively, of the sealant ribbon. The adjustment system comprises a moveable structure and a number of moveable components. The moveable structure is positioned at the output of the dispenser. The moveable structure is configured to be moved relative to the output of the dispenser in a direction along a selected axis to change the depth of the output. The number of moveable components is positioned at the output of the dispenser. Movement of at least one moveable component in the number of moveable components changes the width of the output.

In yet another illustrative embodiment, a method for applying a sealant material onto a surface is provided. A desired configuration for an output of a dispenser is identified. The dispenser is configured to receive a sealant material from a sealant source and dispense the sealant material through the output. A configuration of the output of the dispenser is changed to the desired configuration using an adjustment system associated with the dispenser. The sealant material is dispensed through the output of the dispenser onto a surface to form a sealant ribbon.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account different considerations. For example, the illustrative embodiments recognize and take into account that it may be desirable to have a dispensing system for dispensing sealant material that can be adjusted to form a sealant ribbon having a desired depth and/or desired width over a surface without requiring multiple passes over the surface. Further, the illustrative embodiments recognize and take into account that it may be desirable to have a dispensing system that can change the width and/or depth of the sealant ribbon formed during dispensing of the sealant material.

Thus, the illustrative embodiments provide a method and apparatus for applying a sealant material onto a surface. In one illustrative embodiment, an apparatus comprises a dispenser and an adjustment system associated with the dispenser. The dispenser is configured to receive a sealant material from a sealant source and dispense the sealant material through an output of the dispenser. The adjustment system is configured to change a configuration of the output. The sealant material may be dispensed through the output of the dispenser onto a surface to form a sealant ribbon having a desired depth, a desired width, and a desired shape.

Figure 1:
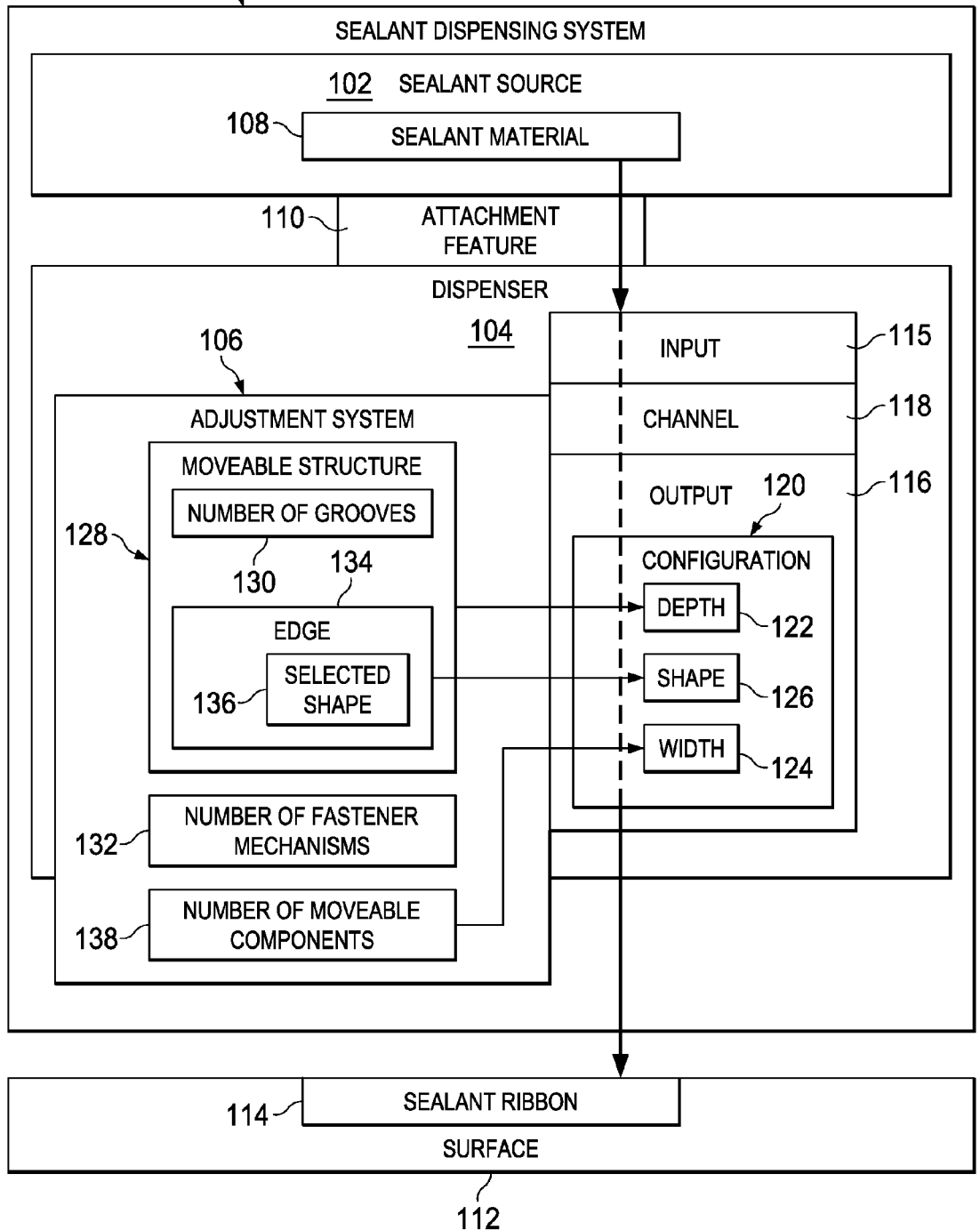
FIG. 1 is an illustration of a sealant dispensing system in the form of a block diagram in accordance with an illustrative embodiment.

With reference now to FIG. 1, an illustration of a sealant dispensing system in the form of a block diagram is depicted in accordance with an illustrative embodiment. In these illustrative examples, sealant dispensing system 100 includes sealant source 102, dispenser 104, and adjustment system 106.

Sealant source 102 is a source of sealant material 108. Sealant source 102 may take the form of, for example, without limitation, a sealant tube, a sealant gun, or some other type of sealant container or storage device. In these illustrative examples, sealant material 108 is a viscous material used to seal different types of surfaces to prevent the penetration of air, gas, noise, smoke, liquid, and/or other types of substances through a surface. Depending on the implementation, sealant material 108 may be comprised of one or more different types of materials.

As depicted, dispenser 104 is configured to be attached to sealant source 102 using attachment feature 110. Attachment feature 110 is associated with dispenser 104 in these illustrative examples. When one component is "associated" with another component, the association is a physical association in the depicted examples.

For example, a first component, such as attachment feature 110, may be considered to be associated with a second component, such as dispenser 104, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In one illustrative example, attachment feature 110 takes the form of a male threaded component attached to dispenser 104 and configured to be received within a female threaded component at an end of sealant source 102. In some cases, attachment feature 110 may be a part of dispenser 104.

Dispenser 104 is configured to receive sealant material 108 from sealant source 102 and dispense sealant material 108 onto surface 112. As depicted, dispenser 104 receives sealant material 108 at input 115 of dispenser 104 and dispenses sealant material 108 at output 116 of dispenser 104. In these illustrative examples, input 115 may be the entrance area into channel 118 located within dispenser 104, while output 116 may be the exit area out of channel 118. Output 116 may take the form of, for example, a slot.

Dispenser 104 is configured to dispense sealant material 108 through output 116 onto surface 112 to form sealant ribbon 114. In particular, dispenser 104 may be moved along surface 112 while sealant material 108 is dispensed through output 116 of dispenser 104 to form sealant ribbon 114.

In these illustrative examples, adjustment system 106 may be used to control the formation of sealant ribbon 114 on surface 112. More specifically, adjustment system 106 may be used to control configuration 120 of output 116 of dispenser 104. Configuration 120 of output 116 may comprise at least one of depth 122, width 124, shape 126, or some other suitable feature of output 116.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C.

The depth 122, width 124, and shape 126 of output 116 determine, respectively, the depth, the width, and the shape of sealant ribbon 114. Consequently, the width, the depth, and/or the shape of sealant ribbon 114 may be changed by changing depth 122, the width 124, and/or shape 126 of output 116 from which sealant material 108 is dispensed.

In these illustrative examples, adjustment system 106 is associated with dispenser 104. In these illustrative examples, adjustment system 106 includes moveable structure 128. Moveable structure 128 may take any number of different forms. For example, moveable structure 128 may take the form of a moveable plate, a moveable bar, or some other type of structure. Moveable structure 128 is positioned at output 116 of dispenser to help control configuration 120 of output 116.

Moveable structure 128 may be moved relative to output 116 in a direction along a selected axis to change configuration 120 of output 116. In particular, moveable structure 128 may be moved to change depth 122 of output 116. Depth 122 of output 116 may also be referred to as the thickness or height of output 116, depending on the implementation.

As depicted, moveable structure 128 may have number of grooves 130. As used herein, a "number of" items may be one or more items. In this manner, number of grooves 130 may be one or more grooves. Number of grooves 130 may be configured to receive number of fastener mechanisms 132. Number of fastener mechanisms 132 may be connected to dispenser 104. In these illustrative examples, number of fastener mechanisms 132 may be considered part of adjustment system 106.

In one illustrative examples, moveable structure 128 may be positioned at output 116 of dispenser 104 by sliding moveable structure 128 relative to number of fastener mechanisms 132 such that number of fastener mechanisms 132 are received within number of grooves 130. Each fastener mechanism in number of fastener mechanisms 132 may include one or more components. These components may include, for example, without limitation, any number of fasteners, screws, bolts, washers, plates, nuts, and/or other types of components.

In this illustrative example, each fastener mechanism in number of fastener mechanisms 132 may be positioned within a corresponding groove in number of grooves 130. Number of fastener mechanisms 132 may be tightened to attach moveable structure 128 to dispenser 104 in a manner such that moveable structure 128 may not be moved.

However, number of fastener mechanisms 132 may be loosened such that moveable structure 128 may be moved relative to number of fastener mechanisms 132 and output 116. In particular, moveable structure 128 may be slid in a direction along the selected axis relative to number of fastener mechanisms 132.

In some illustrative examples, moveable structure 128 may have edge 134 with selected shape 136. Selected shape 136 of edge 134 may form, for example, without limitation, upper edge of shape 126 of output 116. Consequently, the surface of sealant ribbon 114 formed when sealant material 108 is dispensed through output may have a shape corresponding to selected shape 136 of edge 134.

Adjustment system 106 also includes number of moveable components 138 in these illustrative examples. A moveable component in number of moveable components 138 may be selected from one of, for example, without limitation, a fastener, a screw, a rod, a beam, an elongate member, or some other type of component that may be moved relative to output 116 of dispenser 104.

Number of moveable components 138 may be positioned at output 116 of dispenser 104. Movement of at least one moveable component in number of moveable components 138 changes configuration 120 of output 116. In one illustrative example, a moveable component in number of moveable components 138 is positioned substantially perpendicular to output 116. This moveable component may be moved towards the center of output 116 or away from the center of output 116. In this manner, movement of the moveable component changes width 124 of output 116.

In this manner, configuration 120 for output 116 may be changed in a number of different ways such that sealant ribbon 114 may be formed with the desired width, the desired depth, and/or the desired shape. For example, moveable structure 128 may be moved to a selected position relative to output 116 such that output 116 has a desired depth. Further, each of number of moveable components 138 may be moved to a selected position relative to output 116 such that output 116 has a selected width.

The width, depth, and shape desired for sealant ribbon 114 determines the desired depth, the desired width, and the desired shape, respectively, to which depth 122, width 124, and shape 126, respectively, of output 116 are to be changed. Changing configuration 120 of output 116 changes the dimensions and/or shape of sealant ribbon 114.

The illustration of sealant dispensing system 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some cases, output 116 of dispenser 104 may be a primary output. Dispenser 104 may have a secondary output located near output 116 through which sealant material 108 may be dispensed. In this manner, sealant ribbon 114 may be a primary sealant ribbon and a secondary sealant ribbon may be formed near sealant ribbon 114.

In some illustrative examples, adjustment system 106 may be considered part of dispenser 104. In these examples, dispenser 104 may be configured for use with different types of sealant sources in addition to and/or in place of sealant source 102.

In other illustrative examples, different types of moveable structures may be used in adjustment system 106 in addition to and/or in place of moveable structure 128. For example, moveable structure 128 may be used to shape the top surface of sealant ribbon 114, while a second moveable structure may be used to shape the bottom surface of sealant ribbon 114. Moveable structure 128 and the second moveable structure may be both positioned at output 116 and configured to move in a direction along a same axis relative to output 116.

In still other illustrative examples, two moveable structures may be used to shape the sides of sealant ribbon 114. In some cases, moveable structure 128 may be used with another moveable structure positioned at output 116 to form sealant ribbon 114 and another sealant ribbon, respectively, at the same time. In this manner, any number of different types of sealant ribbons may be formed.

Further, in some illustrative examples, adjustments to configuration 120 of output 116 may be made while sealant material 108 is dispensed through output 116. In this manner, sealant ribbon 114 may be formed having varying depths, widths, and/or shapes along the length of sealant ribbon 114.

In some cases, dispenser 104 may be attached to a source of adhesive instead of sealant source 102. In particular, dispenser 104 and adjustment system 106 may be used for dispensing an adhesive material rather than sealant material 108. Of course, in other illustrative examples, dispenser 104 may be attached to a source of some other type of viscous material that is a liquid or semi-liquid material. In some cases, dispenser 104 and adjustment system 106 may be used for dispensing a caulking material, a putty material, a silicone-based material, and/or some other type of material or combination of materials.

Figure 2:
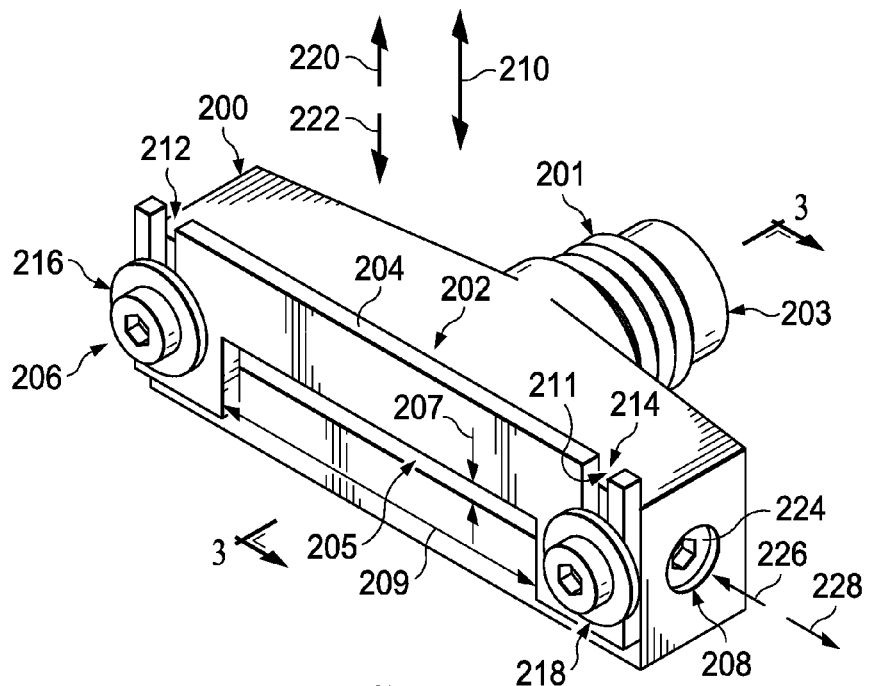
FIG. 2 is an illustration of an isometric view of a dispenser and an adjustment system in accordance with an illustrative embodiment.

With reference now to FIG. 2, an illustration of an isometric view of a dispenser and an adjustment system is depicted in accordance with an illustrative embodiment. In FIG. 2, dispenser 200 and adjustment system 202 associated with dispenser 200 are examples of implementations for dispenser 104 and adjustment system 106 in FIG. 1.

In this illustrative example, attachment feature 201 is associated with dispenser 200. Attachment feature 201 is configured to be attached to a sealant source such that dispenser 200 can receive a sealant material.

Dispenser 200 has input 203 and output 205. Dispenser 200 is configured to receive sealant material through input 203 from a sealant source, such as, for example, a sealant tube. Further, dispenser 200 is configured to dispense that sealant material through output 205. The configuration of output 205 may be adjusted using adjustment system 202. In particular, depth 207 and width 209 of output 205 may be adjusted using adjustment system 202.

As depicted, adjustment system 202 includes moveable structure 204, number of fastener mechanisms 206, and number of moveable components 208. In this illustrative example, moveable structure 204 takes the form of a moveable bar. Moveable structure 204 may be moved relative to output 205 in a direction along axis 210.

In this illustrative example, each fastener mechanism in number of fastener mechanisms 206 is attached to dispenser 200. Moveable structure 204 has number of grooves 211 configured to receive number of fastener mechanisms 206. Number of grooves 211 includes groove 212 and groove 214 and number of fastener mechanisms 206 includes fastener mechanism 216 and fastener mechanism 218.

As depicted, groove 212 is configured to receive fastener mechanism 216, while groove 214 is configured to receive fastener mechanism 218. When fastener mechanism 216 and fastener mechanism 218 are tightened, moveable structure 204 may be unable to move. However, when fastener mechanisms 216 and fastener mechanism 218 are loosened, moveable structure 204 may be moved relative to output 205 and relative to these fastener mechanisms in a direction along axis 210.

For example, when moveable structure 204 is moved in the direction of arrow 220, depth 207 of output 205 is increased. When moveable structure 204 is moved in the direction of arrow 222, depth 207 of output 205 is decreased.

In this illustrative example, number of moveable components 208 includes moveable component 224 and another moveable component (not shown in this view). When at least one of these moveable components is moved, relative to output 205 of dispenser 200, width 209 of output 205 changes. For example, when moveable component 224 is moved in the direction of arrow 226, width 209 of output 205 decrease. When moveable component 224 is moved in the direction of arrow 228, width 209 of output increases.

In this manner, adjustment system 202 may be used to control the configuration of output 205 of dispenser. Width 209 and depth 207 of output 205 determine the width and depth of the sealant ribbon formed when sealant material is dispensed from dispenser 200 through output 205.

Figure 3:
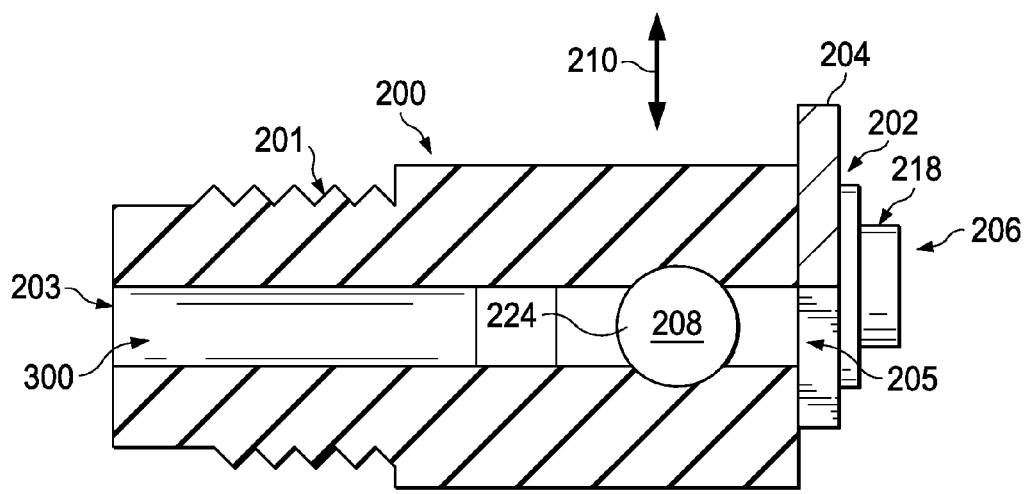
FIG. 3 is an illustration of a cross-sectional view of a dispenser and an adjustment system in accordance with an illustrative embodiment.

With reference now to FIG. 3, an illustration of a cross-sectional view of dispenser 200 and adjustment system 202 from FIG. 2 is depicted in accordance with an illustrative embodiment. In this illustrative example, a cross-sectional view of dispenser 200 and adjustment system 202 is taken along lines 3-3 in FIG. 2. As depicted, input 203 of dispenser 200 is the entrance area into channel 300 in dispenser 200. Further, output 205 of dispenser 200 is the exit area out of channel 300 in dispenser 200.

Figure 4:
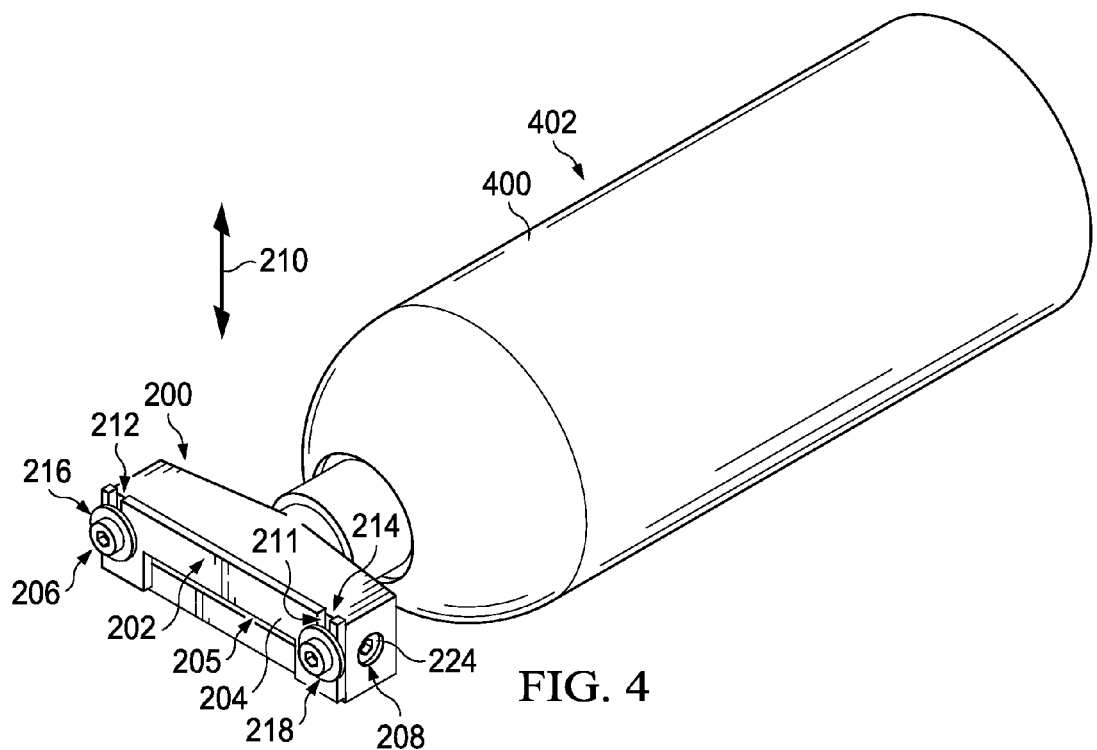
FIG. 4 is an illustration of an isometric view of a sealant dispensing system in accordance with an illustrative embodiment.

With reference now to FIG. 4, an illustration of an isometric view of a sealant dispensing system is depicted in accordance with an illustrative embodiment. In FIG. 4, dispenser 200 from FIG. 2 has been attached to sealant source 400 to form sealant dispensing system 402. In particular, attachment feature 201 in FIG. 2 is used to attach dispenser 200 to sealant source 400. Sealant source 400 takes the form of a sealant tube containing a sealant material in this illustrative example. Sealant source is an example of one implementation for sealant source 102 in FIG. 1.

Figure 5:
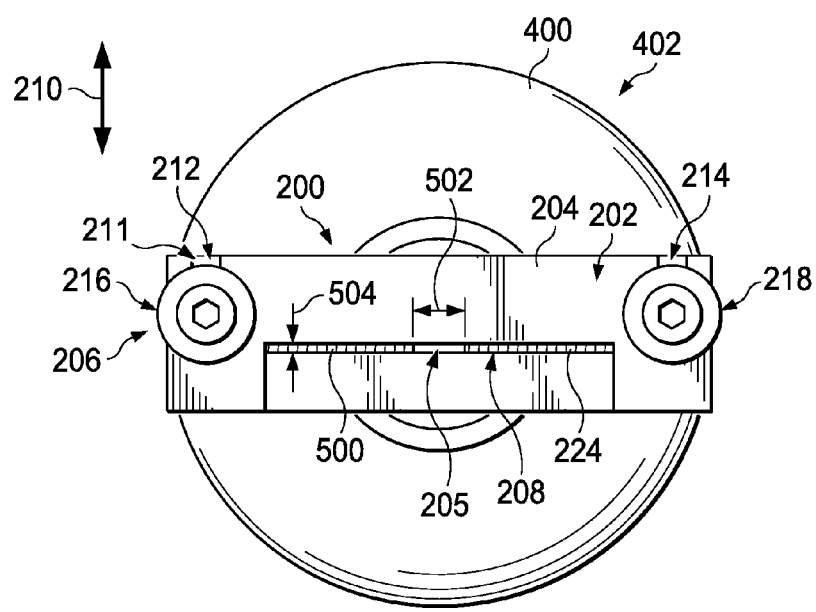
FIG. 5 is an illustration of a front view of a sealant dispensing system in accordance with an illustrative embodiment.

With reference now to FIG. 5, an illustration of a front view of sealant dispensing system 402 from FIG. 4 is depicted in accordance with an illustrative embodiment. In FIG. 5, moveable component 500 belonging to number of moveable components 208 is seen. In this illustrative example, the positions of moveable component 500 and moveable component 224 have been adjusted such that output 205 has width 502. Further, the position of moveable structure 204 has been adjusted such that output 205 has depth 504. As depicted, moving the positions of moveable component 500 and moveable component 224 change an entirety of the width of output 205. The entirety of the width of output 205 are distances that span the length of the side of output 205.

Figure 6:
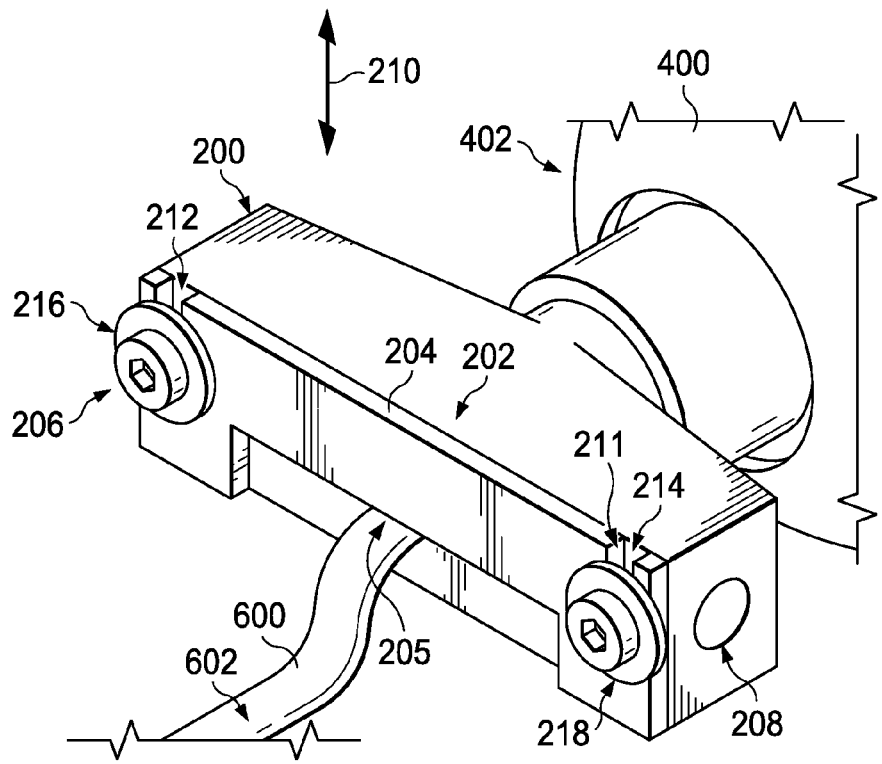
FIG. 6 is an illustration of an isometric view of a portion of a sealant dispensing system in accordance with an illustrative embodiment.

With reference now to FIG. 6, an illustration of an isometric view of a portion of sealant dispensing system 402 from FIG. 5 is depicted in accordance with an illustrative embodiment. In FIG. 6, sealant dispensing system 402 has dispensed sealant material 600 through output 205 to form sealant ribbon 602. The width and the depth of sealant ribbon 602 are determined by width 502 and depth 504 from FIG. 5 of output 205 of dispenser 200.

Figure 7:
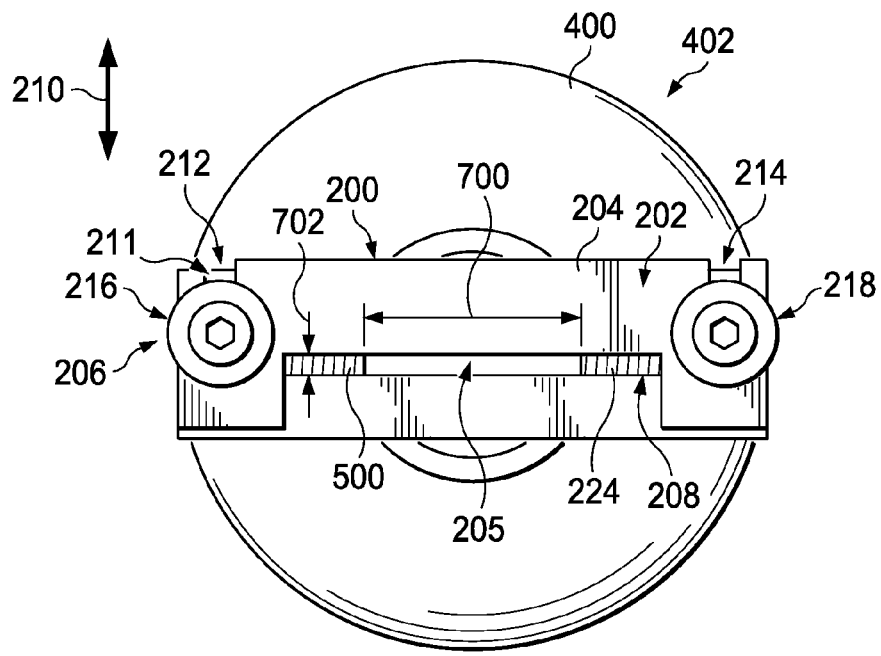
FIG. 7 is an illustration of a front view of a sealant dispensing system in accordance with an illustrative embodiment.

Turning now to FIG. 7, an illustration of a front view of sealant dispensing system 402 from FIG. 4 is depicted in accordance with an illustrative embodiment. In FIG. 7, the positions of moveable component 500 and moveable component 224 have been adjusted such that output 205 has width 700. Width 700 is greater than width 502 in FIG. 5. Further, the position of moveable structure 204 has been adjusted such that output 205 has depth 702. Depth 702 is greater than depth 504 in FIG. 5.

Figure 8:
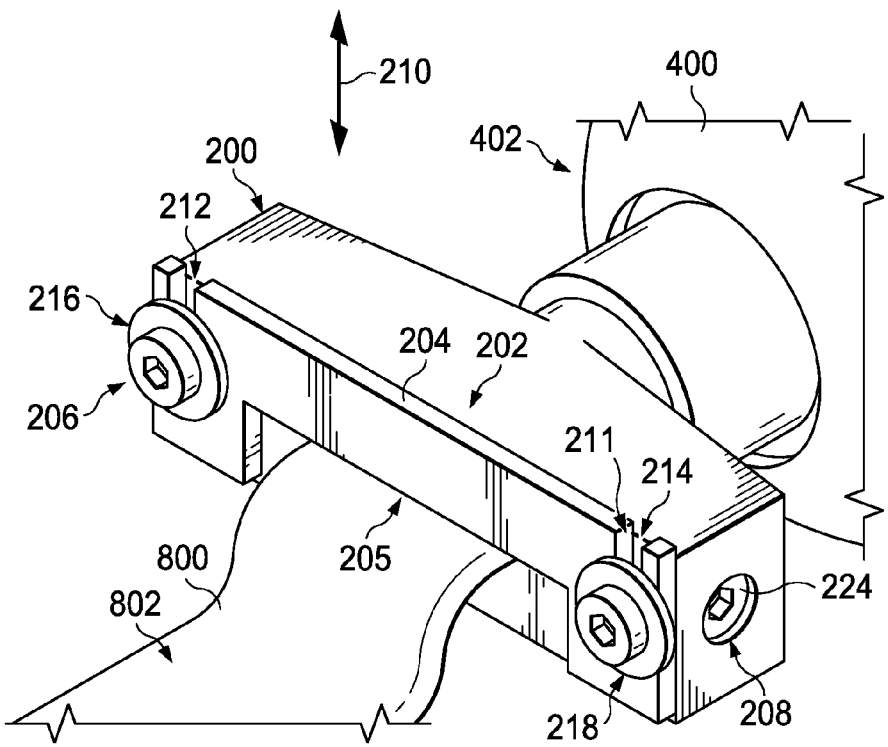
FIG. 8 is an illustration of an isometric view of a portion of a sealant dispensing system in accordance with an illustrative embodiment.

With reference now to FIG. 8, an illustration of an isometric view of a portion of sealant dispensing system 402 from FIG. 7 is depicted in accordance with an illustrative embodiment. In FIG. 8, sealant dispensing system 402 has dispensed sealant material 800 through output 205 to form sealant ribbon 802. With the increased width 700 and depth 702 from FIG. 7 of output 205, sealant ribbon 802 formed by sealant dispensing system 402 is larger in width and depth than sealant ribbon 602 in FIG. 6.

Figure 9:
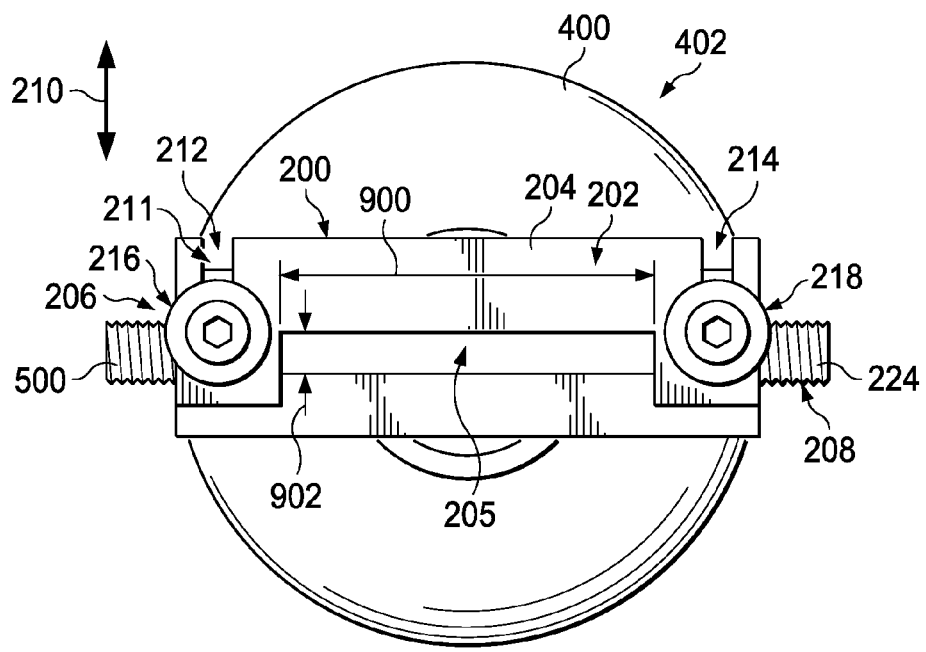
FIG. 9 is an illustration of a front view of a sealant dispensing system in accordance with an illustrative embodiment.

Turning now to FIG. 9, an illustration of a front view of sealant dispensing system 402 from FIG. 4 is depicted in accordance with an illustrative embodiment. In FIG. 9, the positions of moveable component 500 and moveable component 224 have been adjusted such that output 205 has width 900. Width 900 is greater than width 502 in FIG. 5 and width 700 in FIG. 7. Further, the position of moveable structure 204 has been adjusted such that output 205 has depth 902. Depth 902 is greater than depth 504 in FIG. 5 and depth 702 in FIG. 7.

Figure 10:
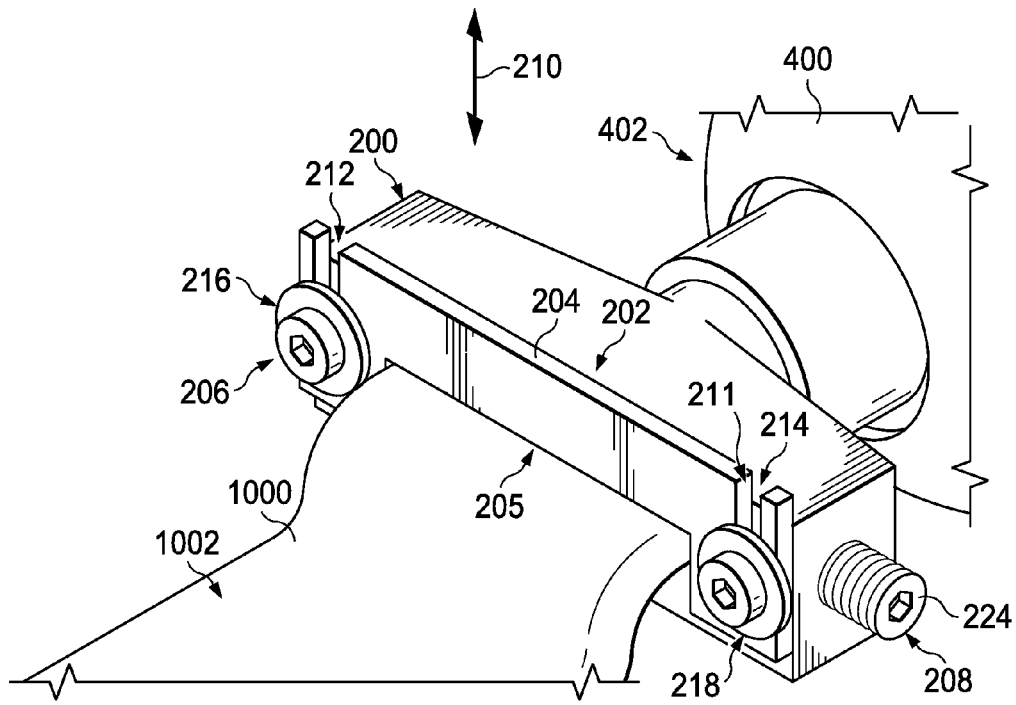
FIG. 10 is an illustration of an isometric view of a portion of a sealant dispensing system in accordance with an illustrative embodiment.

With reference now to FIG. 10, an illustration of an isometric view of a portion of sealant dispensing system 402 from FIG. 9 is depicted in accordance with an illustrative embodiment. In FIG. 10, sealant dispensing system 402 has dispensed sealant material 1000 through output 205 to form sealant ribbon 1002. With the increased width 900 and depth 902 from FIG. 9 of output 205, sealant ribbon 1002 formed by sealant dispensing system 402 is larger in width and depth than sealant ribbon 602 in FIG. 6 and sealant ribbon 802 in FIG. 8.

Figure 11:
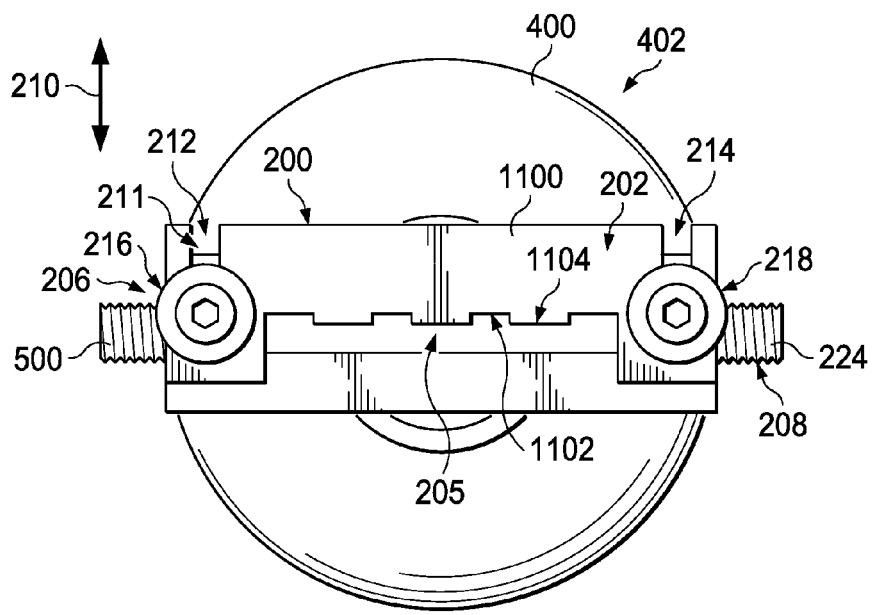
FIG. 11 is an illustration of a front view of a sealant dispensing system in accordance with an illustrative embodiment.

With reference now to FIG. 11, an illustration of a front view of sealant dispensing system 402 from FIG. 4 is depicted in accordance with an illustrative embodiment. In FIG. 11, moveable structure 204 from FIG. 4 has been replaced with moveable structure 1100. Moveable structure 1100 has edge 1102 with selected shape 1104.

Figure 12:
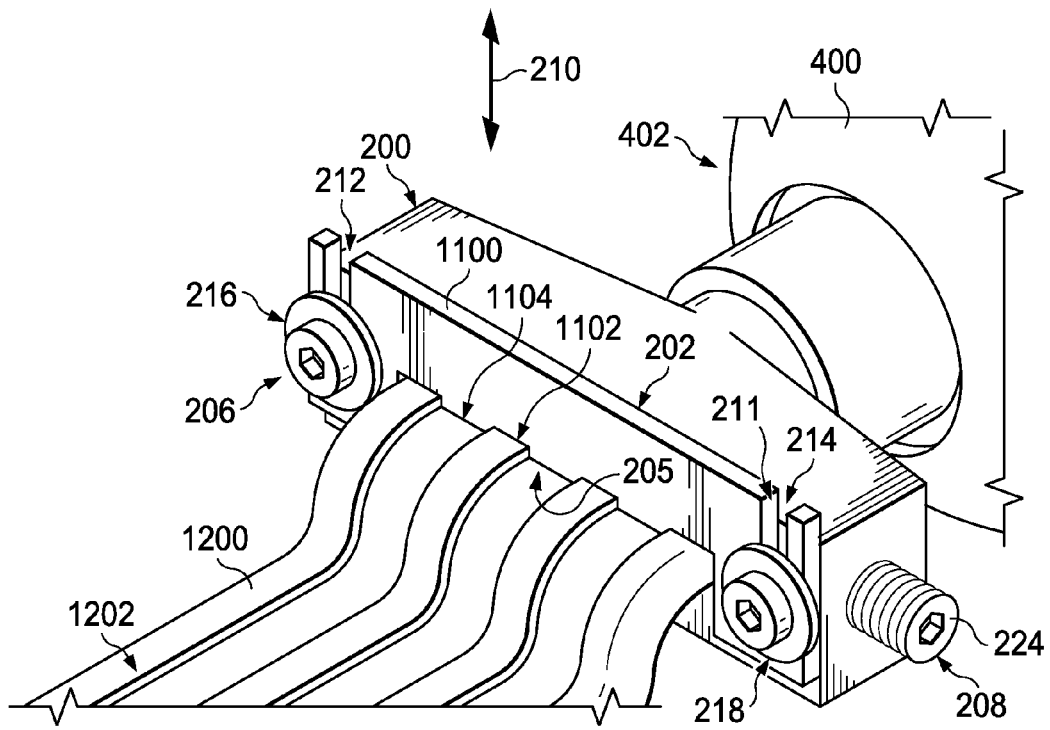
FIG. 12 is an illustration of an isometric view of a portion of a sealant dispensing system in accordance with an illustrative embodiment.

Turning now to FIG. 12, an illustration of an isometric view of a portion of sealant dispensing system 402 from FIG. 11 is depicted in accordance with an illustrative embodiment. With moveable structure 1100 having edge 1102 with selected shape 1104, sealant material 1200 is dispensed through output 205 of dispenser 200 forming sealant ribbon 1202 having a surface with a shape corresponding to selected shape 1104. In particular, the surface of sealant ribbon 1202 has a shape that is a mirror image of selected shape 1104.

The illustrations of dispenser 200 and adjustment system 202 in FIGS. 2-3 and sealant dispensing system 402 in FIGS. 4-12 are not meant to imply physical or architectural limitations to the manner in which an illustrative embodiment may be implemented. Other components in addition to or in place of the ones illustrated may be used. Some components may be optional.

Additionally, some of the components in FIGS. 2-12 may be illustrative examples of how components shown in block form in FIG. 1 can be implemented as physical structures. The different components shown in FIGS. 2-12 may be combined with components in FIG. 1, used with components in FIG. 1, or a combination of the two.

Figure 13:
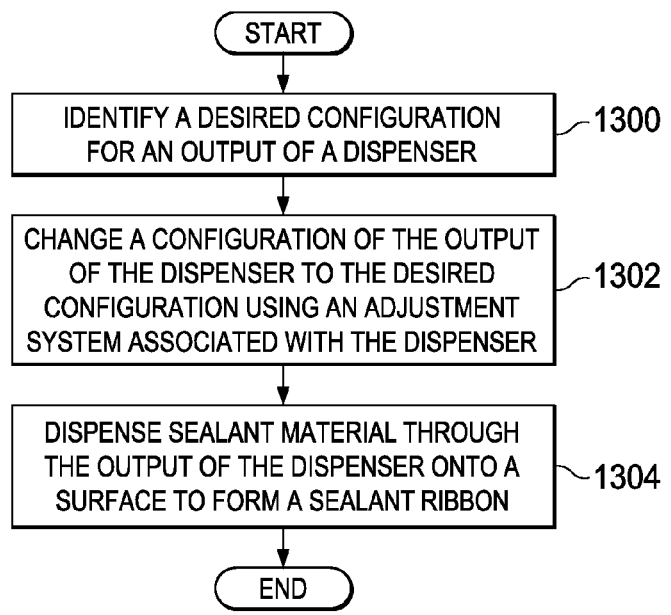
FIG. 13 is an illustration of a process for applying a sealant material onto a surface in the form of a flowchart in accordance with an illustrative embodiment.

With reference now to FIG. 13, an illustration of a process for applying a sealant material onto a surface in the form of a flowchart is depicted in accordance with an illustrative embodiment. The process illustrated in FIG. 13 may be implemented using sealant dispensing system 100 in FIG. 1.

The process begins by identifying a desired configuration for an output of a dispenser (operation 1300). The dispenser is configured to receive a sealant material from a sealant source and dispense the sealant material through the output of the dispenser. The desired configuration for the output of the dispenser may comprise at least one of a depth, a width, and a shape for the output. The desired configuration for the output may be determined by the width, depth, and/or shape desired for the sealant ribbon to be formed by dispensing the sealant material from the dispenser.

The process then changes a configuration of the output of the dispenser to the desired configuration using an adjustment system associated with the dispenser (operation 1302). In operation 1302, the configuration of the output may be changed by moving a moveable structure, such as moveable structure 128 in FIG. 1, and/or a number of moveable components, such as number of moveable components 138 in FIG. 1, relative to the output of the dispenser.

Thereafter, the process dispenses the sealant material through the output of the dispenser onto a surface to form a sealant ribbon (operation 1304), with the process terminating thereafter. In these illustrative examples, operation 1300 and/or operation 1302 may be repeated any number of times while operation 1304 is being performed. In this manner, the sealant ribbon formed may have varying widths, depths, and/or shapes along the length of the sealant ribbon.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a dispenser configured to receive a sealant material from a sealant source and dispense the sealant material through an output of the dispenser; and
    an adjustment system associated with the dispenser and configured to change a configuration of the output, wherein the adjustment system comprises two moveable screws positioned at the output of the dispenser, wherein movement of the two moveable screws changes the configuration of the output of the dispenser when the two moveable screws move in and out of the output of the dispenser to restrict the output, the two moveable screws rotate about an axis that is substantially perpendicular to the output of the dispenser, the output of the dispenser has a width that is restricted along the axis of the two moveable screws, and movement of the two moveable screws along the axis changes an entirety of the width of the output.

2. The apparatus of claim 1, wherein the configuration of the output comprises the width, a depth, and a shape and determines, respectively, the width, the depth, and the shape of a sealant ribbon formed when the sealant material is dispensed through the output of the dispenser.

3. The apparatus of claim 1, wherein the adjustment system comprises:
    a moveable structure positioned at the output of the dispenser, wherein the moveable structure is configured to be moved relative to the output of the dispenser in a direction along a selected axis to change the configuration of the output of the dispenser.

4. The apparatus of claim 3, wherein movement of the moveable structure in the direction along the selected axis changes a depth of the output of the dispenser.

5. The apparatus of claim 3, wherein the moveable structure has an edge with a selected shape and wherein dispensing the sealant material through the output of the dispenser forms a sealant ribbon having a surface with a shape corresponding to the selected shape.

6. The apparatus of claim 3, wherein the moveable structure comprises:
    a number of grooves configured to receive a number of fastener mechanisms, wherein the moveable structure is configured to be moved relative to the number of fastener mechanisms in the direction along the selected axis.

7. The apparatus of claim 1 further comprising:
    an attachment feature associated with the dispenser, wherein the attachment feature is configured to be attached to the sealant source.

8. The apparatus of claim 1, wherein the sealant source is selected from one of a sealant tube and a sealant gun.

9. The apparatus of claim 1, wherein the output of the dispenser is a primary output and wherein the dispenser is configured to dispense the sealant material through a secondary output located near the primary output of the dispenser.

10. A sealant dispensing system comprising:
    a dispenser configured to receive a sealant material from a sealant source and dispense the sealant material through an output of the dispenser onto a surface as a sealant ribbon; and
    an adjustment system associated with the dispenser and configured to change at least one of a width and a depth of the output of the dispenser to change at least one of a width and a depth, respectively, of the sealant ribbon, wherein the adjustment system comprises:
    a moveable structure positioned at the output of the dispenser, wherein the moveable structure is configured to be moved relative to the output of the dispenser in a direction along a selected axis to change the depth of the output; and
    two moveable screws positioned at the output of the dispenser, wherein movement of the two moveable screws changes an entirety of the width of the output when the two moveable screws move in and out of the output of the dispenser to restrict the output, the two moveable screws rotate about an axis that is substantially perpendicular to the output of the dispenser, the output of the dispenser has a width that is restricted along the axis of the two moveable screws, and movement of the two moveable screws along the axis changes the entirety of the width of the output.

11. The sealant dispensing system of claim 10 further comprising:
the sealant source, wherein the dispenser is configured to be attached to the sealant source using an attachment feature associated with the dispenser.

12. A method for applying a sealant material onto a surface, the method comprising:
identifying a desired configuration for an output of a dispenser, wherein the dispenser is configured to receive the sealant material from a sealant source and dispense the sealant material through the output;
changing a configuration of the output of the dispenser to the desired configuration using an adjustment system associated with the dispenser, wherein the adjustment system comprises two moveable screws positioned at the output of the dispenser, wherein movement of the two moveable screws changes the configuration of the output of the dispenser when the two moveable screws move in and out of the output of the dispenser to restrict the output, the two moveable screws rotate about an axis that is substantially perpendicular to the output of the dispenser, the output of the dispenser has a width that is restricted along the axis of the two moveable screws, and movement of the two moveable screws along the axis changes an entirety of the width of the output; and
dispensing the sealant material through the output of the dispenser onto the surface to form a sealant ribbon.

13. The method of claim 12, wherein changing the configuration of the output of the dispenser to the desired configuration using the adjustment system associated with the dispenser comprises:
moving a moveable structure positioned at the output of the dispenser relative to the output of the dispenser in a direction along a selected axis to change the configuration of the output.

14. The method of claim 13, wherein moving the moveable structure comprises:
loosening a number of fastener mechanisms located within a number of grooves in the moveable structure, wherein the number of fastener mechanisms attach the moveable structure to the dispenser;
moving the moveable structure relative to the number of fastener mechanisms in the direction along the selected axis to a selected position to change a depth of the output to a desired depth for the output; and
tightening the number of fastener mechanisms to hold the moveable structure in the selected position at the output of the dispenser.

15. The method of claim 12, wherein changing the configuration of the output of the dispenser to the desired configuration using the adjustment system associated with the dispenser comprises:
moving at least one of the two moveable screws positioned at the output of the dispenser to change the configuration of the output.

16. The method of claim 15, wherein moving the at least one of the two moveable screws comprises:
moving the at least one of the two moveable screws to a selected position relative to the output of the dispenser to change the width of the output to a desired width for the output.

17. The method of claim 12, wherein the step of dispensing the sealant material comprises:
dispensing the sealant material through a primary output of the dispenser onto the surface to form a primary sealant ribbon; and
dispensing the sealant material through a secondary output of the dispenser onto the surface to form a secondary sealant ribbon located near the primary sealant ribbon.

* * * * *